(12) United States Patent
Parkvall et al.

(10) Patent No.: US 8,954,104 B2
(45) Date of Patent: Feb. 10, 2015

(54) SYNCHRONIZATION OF PICO-NODES IN A HETEROGENEOUS CELLULAR NETWORK DEPLOYMENT

(75) Inventors: Stefan Parkvall, Stockholm (SE); Erik Dahlman, Bromma (SE); George Jöngren, Stockholm (SE); Lars Lindbom, Karlstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 13/389,605

(22) PCT Filed: Nov. 2, 2011

(86) PCT No.: PCT/SE2011/051310
§ 371 (c)(1),
(2), (4) Date: Feb. 9, 2012

(87) PCT Pub. No.: WO2012/112098
PCT Pub. Date: Aug. 23, 2012

(65) Prior Publication Data
US 2012/0270594 A1    Oct. 25, 2012

Related U.S. Application Data

(60) Provisional application No. 61/442,990, filed on Feb. 15, 2011.

(51) Int. Cl.
*H04B 7/00* (2006.01)
*H04W 56/00* (2009.01)
*H04W 16/32* (2009.01)

(52) U.S. Cl.
CPC ...... *H04W 56/0035* (2013.01); *H04W 56/0015* (2013.01); *H04W 16/32* (2013.01)
USPC ........... 455/502; 455/501; 455/524; 455/438; 455/509; 370/331; 370/330; 370/350

(58) Field of Classification Search
CPC ................................................. H04W 56/0035
USPC .......... 455/502, 501, 524, 438, 509; 370/331, 370/330, 350
See application file for complete search history.

(56) References Cited

U.S. PATENT DOCUMENTS

2008/0085721 A1    4/2008  Hirano et al.
2010/0279695 A1*  11/2010  Amirijoo et al. .............. 455/438
(Continued)

FOREIGN PATENT DOCUMENTS

WO          9809390        3/1998
WO     2010027587 A1      3/2010

*Primary Examiner* — Sanh Phu
(74) *Attorney, Agent, or Firm* — Murphy, Bilak & Homiller, PLLC (57) ABSTRACT

A high-power point (110) and one or more low-power points (120) transmit signals associated with the same cell-identifier in a heterogeneous cell deployment. Coverage areas corresponding to the low-power points (120) fall at least partly within the coverage area for the high-power point, so that mobile stations (130) within range of a low-power point are also within range of the high-power point (110). A low-power point (120) measures timing or frequency, or both, of one or more signals received at the low-power point (120) from the high-power point (110), and adjusts the timing or frequency, or both, of a transmission from the low-power point (120) to a mobile station (130), to align the transmission with signals received by the mobile station (130) from the high-power point (110).

18 Claims, 5 Drawing Sheets

(56) References Cited

U.S. PATENT DOCUMENTS

| | | | |
|---|---|---|---|
| 2011/0200032 A1* | 8/2011 | Lindstrom et al. | 370/350 |
| 2012/0178482 A1* | 7/2012 | Seo et al. | 455/501 |
| 2012/0201164 A1* | 8/2012 | Jongren et al. | 370/252 |
| 2013/0070726 A1* | 3/2013 | Zhang et al. | 370/331 |
| 2014/0036786 A1* | 2/2014 | Kazmi et al. | 370/329 |

* cited by examiner

SYNCHRONIZATION OF PICO-NODES IN A HETEROGENEOUS CELLULAR NETWORK DEPLOYMENT

RELATED APPLICATION

This application claims priority to U.S. Provisional Application Ser. No. 61/442,990, filed 15 Feb. 2011, the entire contents of which are incorporated by reference herein.

TECHNICAL FIELD

The present invention relates generally to the control of transmitters in wireless communication networks, and more particularly relates to techniques for synchronizing transmissions among nodes in a heterogeneous cell deployment.

BACKGROUND

The $3^{rd}$-Generation Partnership Project (3GPP) is continuing development of the fourth-generation wireless network technologies known as Long-Term Evolution (LTE). Improved support for heterogeneous network operations is part of the ongoing specification of 3GPP LTE Release-10, and further improvements are being discussed in the context of new features for Release-11. In heterogeneous network deployments, a mixture of network nodes of different maximum transmit powers and overlapping coverage areas of different sizes are deployed. The term network node here can refer to, for example, a base station, an access point, or a relay node. In some contexts, the more general terms "point" or "transmission point" are used.

Figure 1:
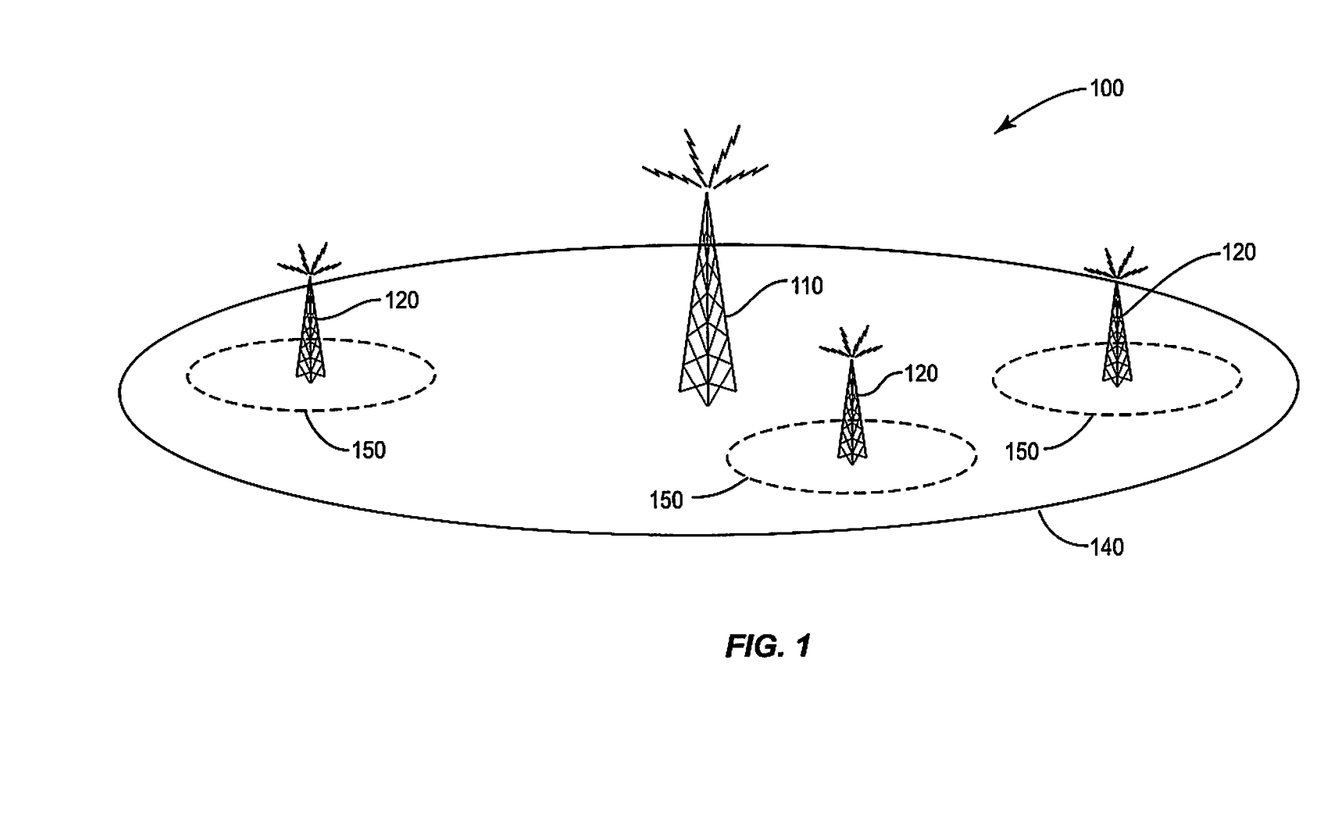
FIG. 1 illustrates several pico-nodes in the coverage area of a macro node

One example of such a deployment is seen in the system 100 illustrated in FIG. 1, where several lower-power pico-nodes 120, each with a respective coverage area 150, are deployed within the larger coverage area 140 of a higher power macro-node 110. The system 100 of FIG. 1 is suggestive of a wide-area wireless network deployment. However, other examples of low-power nodes in heterogeneous networks are home base stations, also referred to as femtonodes, and relays.

Throughout this document, nodes in a network are often referred to as being of a certain type, e.g., a "macro-" node, or a "pico-" node. However, unless explicitly stated otherwise, this should not be interpreted as an absolute quantification of the role of the node or point in the network but rather as a convenient way of discussing the roles of different nodes or points relative to one another. For example, this usage simply indicates that one point, e.g., a macro-node, has a relatively high maximum transmit power and thus a relatively large coverage area, while another point, e.g., a pico-node, has lower transmit power and a smaller coverage area. Thus, a discussion about macro- and pico-nodes could just as well be applicable to the interaction between micro-nodes and femtonodes, for example. It should also be noted that in a heterogeneous deployment consisting of macro-nodes and pico-nodes, the communication links associated with the macro-nodes and the communication links associated with the pico-nodes are often referred to as belonging to different layers, e.g., macro layer and pico layer, respectively.

One aim of deploying low-power nodes such as pico-nodes within the coverage area of a macro-node is to improve system capacity, by means of area-splitting gains. In addition to improving overall system capacity, this approach also allows users to be provided with a wide-area experience of very-high-speed data access, throughout the network. Heterogeneous deployments are in particular effective to cover traffic hotspots, i.e., small geographical areas with high user densities. These areas can be served by pico-nodes, for example, as an alternative deployment to a denser layer of macro-nodes.

One way to operate heterogeneous networks is to apply frequency separation between the different layers. For instance, the macro-node 110 and pico-nodes 120 pictured in FIG. 1 can be configured to operate on different, non-overlapping carrier frequencies, thus avoiding any interference between the layers. Another approach to operating a heterogeneous network is to share radio resources between layers. Thus, two (or more) layers can use the same carrier frequencies, by coordinating transmissions across macro-nodes and under-laid pico nodes. In the following discussion it is assumed that the macro-nodes and pico-nodes share a common set of frequencies.

Thus, as can be seen in FIG. 1, in a heterogeneous cell deployment a high-power point and one or more low-power points both transmit signals to mobile stations. Coverage areas corresponding to the low-power points fall at least partly within the coverage area for the high-power point, so that mobile stations within range of a low-power point are also within range of the high-power point.

In one approach to heterogenous cellular-network deployments, the pico-nodes create separate cells with separate cell identities that are different from the cell created by the macro node. In this case, the pico nodes must generally transmit a full complement of common signals and control channels. In an LTE context, this may include, for example, the cell-specific reference signals (CRS), primary synchronization signal (PSS) and secondary synchronization signal (SSS) and the broadcast channel (BCH).

An alternative approach to heterogeneous cellular-network deployment is one in which the pico-node does not correspond to a cell of its own. In other words, a pico-node in these deployments does not have a cell-ID distinct from that provided by the macro-node, but instead simply provides a data-rate and capacity "extension" of the overlaid macro-cell. In an LTE environment, for example, CRS, PSS, and SSS, as well as channels that rely on CRS for reception, such as PDCCH and PBCH, are then transmitted from the macro-node. The data-carrying PDSCH for a given mobile station, on the other hand, can be transmitted from the pico-node. So called UE-specific reference signals are then also transmitted from the pico-node, together with the PDSCH, for aiding in PDSCH demodulation and detection.

SUMMARY

In a heterogeneous cellular network deployment where a given pico-node does not create a cell of its own, it is important that the signals transmitted from the macro-node, e.g. common signals, and the signals transmitted from the pico-nodes, e.g. PDSCH in an LTE context, arrive approximately time aligned and with the same frequency at the mobile terminals, despite the fact that they have been transmitted from different nodes and have propagated through different radio channels. Accordingly, various embodiments of the present invention provide for synchronizing the timing and/or the frequency of transmissions from the pico-node with those from the macro-node, so that transmissions from the two points are aligned in the vicinity of the pico-node. This ensures that transmissions from the macro-node, such as the PDCCH, and the pica-node, such as the PDSCH, are time- and/or frequency-aligned at any UE in the coverage area of the pico-node.

In particular, the timing and/or frequency of a pico node's transmissions can be aligned with the timing and/or frequency of macro transmissions as observed by the pico-node itself. This can be achieved by, at the pico-node, measuring timing and/or frequency on one or more transmissions from the macro-node. For example, the synchronization signals and/or the cell-specific reference signals transmitted by the macro-node can be measured by the pico-node, which can then fine-tune its own transmission timing and transmission frequency to ensure alignment at the UE.

Several methods for carrying out these synchronization techniques are described in detail below. Some of these methods might be implemented in a pico-node, for example, where the pico-node is a transmitting node having a coverage area that falls entirely or substantially within the coverage area of another transmitting node, e.g., a macro-node. An example of such a method begins with receiving a signal transmitted by the macro-node. The pico-node then measures the timing of the received signal, the frequency of the received signal, or both. Finally, the pico-node adjusts the timing, frequency, or both, of a signal transmitted by the pico-node to a mobile station, based on the results of the measurement. The adjustment aligns the transmission, in timing and/or in frequency, with the signals received at the UE from the macro-node.

The signals received at the pico-node and used for the measurements can include, in various embodiments, one or more of a primary synchronization signal (PSS), a secondary synchronization signal (SSS), a cell-specific reference signal, and a broadcast channel signal. Measurements may be made on one or several of these or other signals; in some cases multiple measurements may be combined, such as by averaging the results, to improve accuracy. The results may be used to modify timing and/or frequency of any signals transmitted to the UE from the pico-node, such as an LTE PDSCH signal.

Another example method, which may be combined with the above-described techniques in some embodiments, may be implemented in either one of a pico-node or a macro-node, again in situations where the pico-node has a coverage area that falls entirely or substantially within the coverage area of the macro-node. This method begins with the receiving of an uplink transmission from a mobile terminal at one of the nodes. The receiving node measures the timing, frequency, or both, of the signal transmitted by the mobile terminal. In addition, timing data, frequency data, or both, are received from the second one of the pico-node or macro-node, wherein the timing data, frequency data, or both, relates to the same signal transmitted by the mobile terminal. A timing offset, a frequency offset, or both, are then calculated, based on the measured timing and/or frequency and the received timing data and/or frequency data.

In some embodiments, the timing offset or frequency offset is then used directly to adjust the timing and/or frequency of transmissions to the mobile terminal, such as the timing and/or frequency of an LTE PDSCH signal. In others, the timing offset or frequency offset is sent to the second node, for use by the second node in adjusting the timing and/or frequency of transmissions to the mobile terminal.

Apparatus for carrying out the various processes disclosed herein are also described, including an example pico-node configured according to some embodiments of the present invention. Of course, the present invention is not limited to the features and advantages summarized above. Indeed, those skilled in the art will recognize additional features and advantages of the present invention upon reading the following detailed description and viewing the attached drawings.

DETAILED DESCRIPTION

Various embodiments of the present invention are now described with reference to the drawings, where like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for LTE and LTE-Advanced is used throughout this document to exemplify the invention, this should not be seen as limiting the scope of the invention to only these systems. Other wireless systems including or adapted to include heterogeneous cellular-network deployments may also benefit from exploiting the ideas covered herein.

In one type of heterogeneous network deployment, a pico-node corresponds to a cell of its own, thus forming a "pico-cell." This means that, in addition transmitting and receiving user data to one or more UEs, the pico-node also transmits all or almost all of the common signals and common channels associated with a cell. In the LTE context, for example, this includes the Primary Synchronization Signal (PSS) and Secondary Synchronization (SSS), which correspond to the Physical Cell Identity (cell-ID) of the pico-cell. This also includes the Cell-specific reference signals (CRS), which again correspond to the Physical Cell Identity of the cell. The CRS can, for example, be used for downlink channel estimation to enable coherent demodulation of downlink transmissions. Still another common channel transmitted by a pico-node that serves a cell of its own is the Broadcast channel (BCH), which provides system information specific to the pico-cell. Additional system information is transmitted on the PDSCH physical channel.

Since the pico-node in this scenario transmits the common signals/channels, the corresponding pico-cell can be detected and selected (i.e., connected to) by a mobile terminal (user equipment, or UE, in 3GPP terminology). Further, where the pico-node corresponds to a cell of its own, so-called L1/L2 control signaling on the Physical Downlink Control Channel (PDCCH) is also transmitted from the pico-node to connected UEs, in addition to downlink data transmission on the Physical Downlink Shared Channel (PDSCH). The L1/L2 control signaling provides downlink and uplink scheduling information, among other things, as well as Hybrid-ARQ-related information to UEs within the cell.

Figure 2:
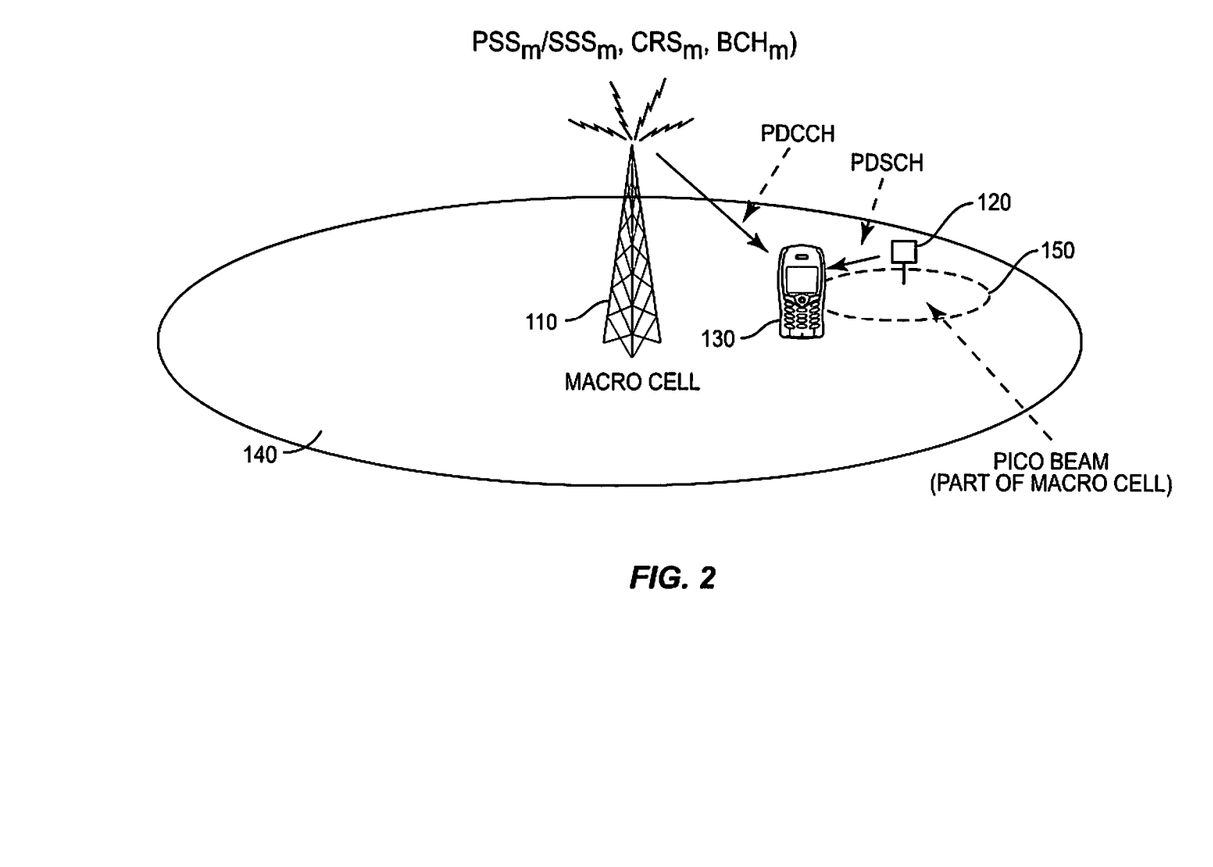
FIG. 2 illustrates a heterogeneous cellular-network deployment where the cell-id is shared between the macro-node and pico-nodes in the macro-nodes coverage area.

An alternative approach to heterogenous cellular-network deployment is illustrated in FIG. 2, in which pico-node 120 does not correspond to a cell of its own, i.e., having a cell-ID distinct from that provided by macro-node 110, but instead simply provides a data-rate and capacity "extension" of the overlaid macro-cell. A discussion of this approach is found in U.S. patent application Ser. No. 13/127,854, filed 5 May 2011 as a national stage entry from International Patent Application No. PCT/SE10/51134, the entire contents of which national stage application are incorporated herein by reference.

In the scenario illustrated in FIG. 2, the CRS, PSS and SSS, as well as channels that rely on CRS for reception, such as PDCCH and PBCH, are transmitted from the macro-node. The data-carrying PDSCH is transmitted from the pico-node. To allow for demodulation and detection of the PDSCH, despite the fact that no CRS is transmitted from the pico-node, so-called UE-specific reference signals are transmitted from the pico-node, together with the PDSCH. The UE-specific reference signals can then be used by the UE for PDSCH demodulation/detection.

In a heterogeneous deployment with pico-nodes of this sort, i.e., with pico-nodes not corresponding to their own cells (FIG. 2), the above-described problem of excessive common/control-channel interference to pico-node-connected UEs from the macro-cell transmission is not present, since the common channels and L1/L2 control channels are, in this case, always transmitted by and received from the macro-node, even while PDSCH is transmitted from the pico-node. This approach to heterogeneous deployments is attractive since it does not rely in any new functionality in the UEs but can allow existing UEs to exploit the full gains of the pico-node.

Figure 3:
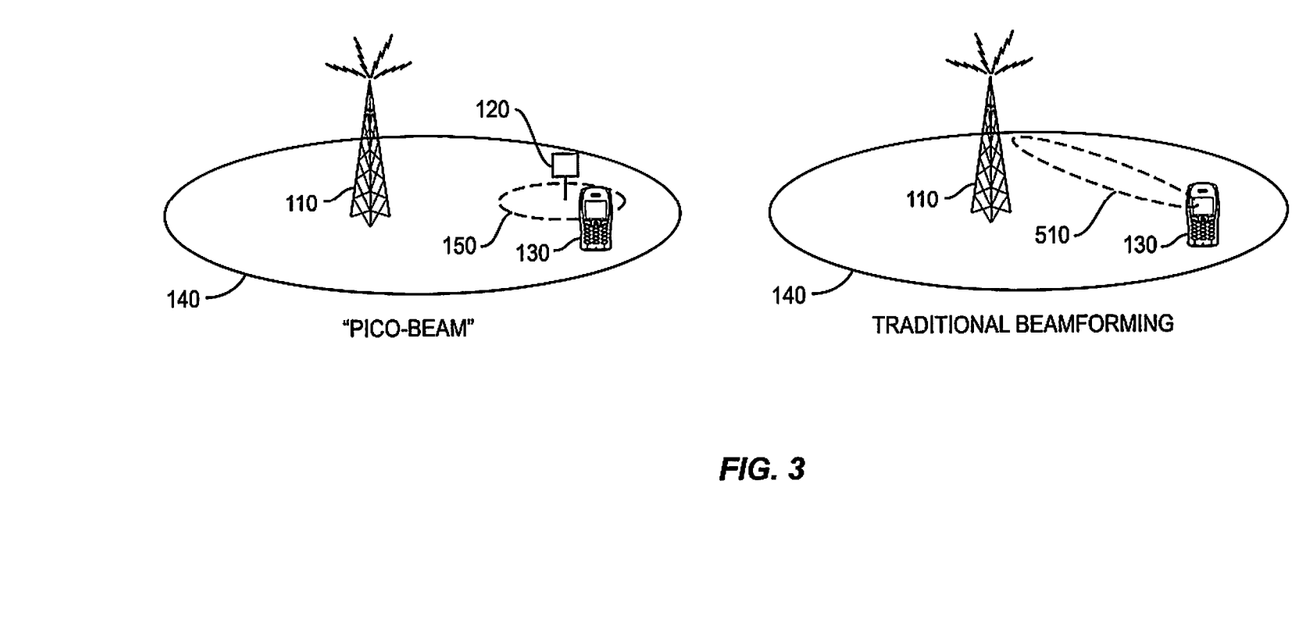
FIG. 3 contrasts a "pico-beam" formed by a pico-node in a heterogeneous cell deployment with conventional beamforming.

In the case when the pico-node does not correspond to a cell of its own, as described above, the pico transmission is essentially equivalent to a beam-formed transmission within the macro-cell. The primary difference from "normal" beam forming is that, in this case, the beam is localized around the pico-site rather than having a traditional beam shape originating at the macro-site. This is shown in FIG. 3, where the left-hand diagram illustrates a "pico-beam" formed by the coverage area 150 surrounding a pico-node 120, while the right-hand diagram illustrates a conventional beam 510 transmitted from the macro-node 110. From the perspective of a UE 130 within either beam, these scenarios are essentially identical.

It should be noted that, regardless of whether the pico-node corresponds to a cell of its own or just creates a "pico-beam" extension of the macro-cell, uplink transmissions, including both uplink data transmission on the Physical Uplink Shared Channel (PUSCH) and uplink L1/L2 control signaling on the Physical Uplink Control Channel (PUCCH), can still be received at the pico-site.

It should also be noted that, although the terms "macro" and "pica" are used throughout the present disclosure, this does not limit the techniques disclosed herein to nodes carrying these particular names. Rather, the characteristics of the "macro" and "pico" nodes that are relevant to the present techniques are that the former transmits common signals used by a UE that is receiving downlink data transmissions from the latter. Furthermore, it should be understood that more than two nodes may be involved in the transmission/reception, although for the sake of simplicity only two nodes have been assumed to be involved in the transmission/reception to a certain UE. Finally, while the techniques disclosed herein are described in connection with Long-Term Evolution (LTE) systems as standardized by the $3^{rd}$-Generation Partnership Project (3GPP), these techniques are by no means limited exclusively to these systems, but may be adapted to other wireless communication systems with relevant similarities.

When receiving a downlink transmission, a UE needs to adjust its timing and/or local oscillator frequency to the transmitted signal in order to properly receive it. Typically, initial estimates of timing and frequency errors are obtained from the synchronization signals as part of the cell search procedure. Once the UE has connected to a certain cell, it will generally lock its timing and/or frequency to the signals transmitted from the base station, for example by using the cell-specific reference signals, in order to track and compensate for any timing and/or frequency drift of its internal circuitry. These techniques are well known.

However, in the current LTE UE design, there is an implicit assumption that all of the transmitted channels and signals corresponding to a given cell arrive at the UE at the same time and with the same frequency. In practice, this is generally the case when all of the signals originate from the same transmission point or transmission points, as seen by the UE. Conventionally, all signals are transmitted from a single antenna arrangement at a single base station but they could also be transmitted from a set of geographically separated antennas. Even in this case, however, as long as all signals/channels are transmitted from the same set of antennas, it will appear to the UE as a single virtual antenna, with the same characteristics for common signals, control channels, and traffic channels.

But, in configurations where the pico-node is providing a "pico beam," as described above, this assumption no longer holds, since the PDSCH is transmitted from the pico-node while the common signals are transmitted from the macro-node. This creates several problems. First, the transmissions in conventional systems are unsynchronized. Second, the PDSCH is transmitted through a completely different radio channel from that used to carry the common signals. As a result of these issues, depending on the position and the motion of the UE, these signals will have different timings, and even slightly different frequencies, making the tracking of timing and frequency problematic.

One solution to this problem is to modify the UE so that it can separately handle different timings and/or frequencies for each of two or more different channels. However, this would require new functionality in the UE, and would not allow existing UEs to exploit the full gains of pico-nodes. Hence, there is a need for solutions that allow for PDSCH transmission from one location while other signals/channels are transmitted from another, without adversely impacting the behavior of existing UEs.

Another approach, which does not require changes to the UE, is to synchronize the timing and/or the frequency of transmissions from the pico-node with those from the macro-node, so that transmissions from the two nodes are aligned at the pico-node or at a given location in the vicinity of the pico-node. This ensures that transmissions from the macro-node, such as the PDCCH, and the pico-node, such as the PDSCH, are both time-aligned and/or frequency-aligned at any UE close to the pico-node or close to that given location.

In particular, the timing and/or frequency of the pico-node transmission can be aligned with the timing and/or frequency of macro transmissions as observed by the pica-node itself. This can be achieved by, at the pico-node, measuring timing and/or frequency on one or more transmissions from the macro-node. For example, the synchronization signals and/or the cell-specific reference signals transmitted by the macro-node can be measured by the pico-node, which can then fine-tune its own transmission timing and transmission frequency to ensure alignment at the UE.

Often, the coverage area of a pico-node deployed to provide very high data rates is small, such as on the order of a few tens of meters. Hence, the propagation delay from the pico-node to a UE connected to the pico-node is small, and only insignificant differences in timing are observed throughout the pico coverage area, irrespective of the UE's position within that coverage area. Thus, aligning the transmission timing of the pico-node with the macro timing as observed by the pico-node is sufficient to achieve an effective time alignment at the UE over the entire coverage area of low-power pico-nodes. Of course, this approach requires the pico-node to be equipped with a receiver capable of receiving the necessary signals from the macro.

Alternatively, or as a complement to the above approach, the pico-node's transmission timing can be adjusted based on measurements of uplink transmissions from the UEs, such as measurements of sounding reference signals transmitted by the UEs or measurements made on random-access attempts. By proper configuration of the UEs, via control messages, such uplink transmissions can be scheduled to occur at well-defined time instants. If these uplink transmissions are received by both the pico-node and the macro-node, the time difference between the reception instances can be computed. Based on the computed time difference, the macro-node signals a timing offset to the pica-node, which adjusts the timing of the PDSCH transmission accordingly. This approach allows for individual timing adjustments for PDSCH transmissions to different UEs. Estimating the time difference between macro- and pico-reception could be done by comparing the observed timing in the two nodes with a global time reference (e.g. GPS), or, if the delay in the backhaul connection between from the pico to the macro is known, by directly comparing, at the macro-node, the timing of the signal received from the UE over the air and the same signal received by the pico-node and forwarded to the macro-node.

Furthermore, it can often be assumed that UEs connected to the pico-node are standing still or moving at slow speeds, since high-mobility UEs will be within range of very small pico-nodes for only very short periods of time. Given this assumption, the frequency shift due to Doppler effects perceived at the UE is similar for signals received from the macro-node and the pico-node. Thus, aligning the transmission frequency of the pico-node with the macro-node's transmission frequency as observed by the pico-node is sufficient to achieve a frequency alignment at the UE.

Figure 4:
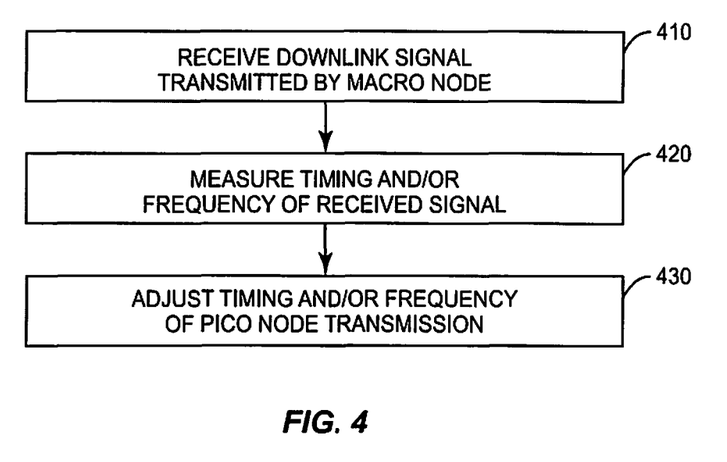
FIG. 4 is a process flow diagram illustrating a method for synchronizing transmissions between a macro-node and a pico-node.

FIG. 4 illustrates an example method for carrying out these synchronization techniques, such as might be implemented in a pico-node, where the pica-node is a transmitting node having a coverage area that falls entirely or substantially within the coverage area of another transmitting node, e.g., a macro-node. The illustrated method begins with receiving a signal transmitted by the macro-node, as shown at block 410. The pico-node then measures the timing of the received signal, the frequency of the received signal, or both, as shown at block 420. Finally, the pico-node adjusts the timing, frequency, or both, of a signal transmitted by the pico-node to a mobile station, based on the results of the measurement, as shown at block 430. The adjustment aligns the transmission, in timing and/or in frequency, with the signals received at the UE from the macro-node.

The signals received at the pico-node and used for the measurements can include, for example, one or more of a primary synchronization signal (PSS), a secondary synchronization signal (SSS), a cell-specific reference signal, and a broadcast channel signal. Measurements may be made on one or several of these or other signals; in some cases multiple measurements may be combined, such as by averaging the results, to improve accuracy. The results may be used to modify timing and/or frequency of any signals transmitted to the UE from the pico-node, such as an LTE PDSCH signal.

Figure 5:
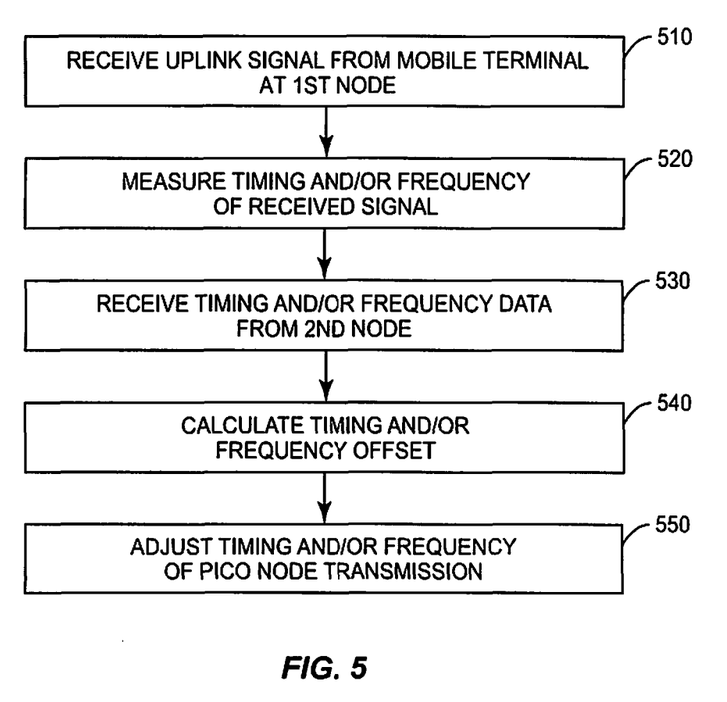
FIG. 5 is a process flow diagram illustrating another method for synchronizing transmissions between a macro-node and a pico-node.

FIG. 5 illustrates another example method, according to some embodiments of the invention, which may be implemented in either one of a pico-node or a macro-node, again where the pico-node has a coverage area that falls entirely or substantially within the coverage area of the macro-node. It should be noted that the approach illustrated in FIG. 5 can be used alone, in some embodiments, or in combination with the technique illustrated in FIG. 4 and described above. The illustrated method begins with the receiving of an uplink transmission from a mobile terminal at one of the nodes, as shown at block 510. The receiving node measures the timing, frequency, or both, of the signal transmitted by the mobile terminal, as shown at block 520. In addition, as shown at block 530, timing data, frequency data, or both, are received from the second one of the pico-node or macro-node, wherein the timing data, frequency data, or both, relates to the same signal transmitted by the mobile terminal. As shown at block 540, a timing offset, a frequency offset, or both, are then calculated, based on the measured timing and/or frequency and the received timing data and/or frequency data.

In some embodiments, the timing offset or frequency offset is then used directly to adjust the timing and/or frequency of transmissions to the mobile terminal, such as the timing and/or frequency of an LTE PDSCH signal. In others, the timing offset or frequency offset is sent to the second node, for use by the second node in adjusting the timing and/or frequency of transmissions to the mobile terminal.

In some embodiments, rather than obtaining explicit timing data from the second node, timing data can be obtained from observing the timing of data forwarded from the second node and comparing that timing to the timing of the transmissions received at the first node. These embodiments may be configured to account for a known latency in the forwarding of data from the second node to the first node.

The techniques illustrated in FIGS. 4 and 5 can be combined, in some embodiments. Thus, for example, a pico-node that carries out the method illustrated in FIG. 5 can also measure a received timing or a received frequency, or both, of one or more signals received from the macro-node by the pico-node, and base its adjustment of its own downlink signal based on those measurements as well.

Figure 6:
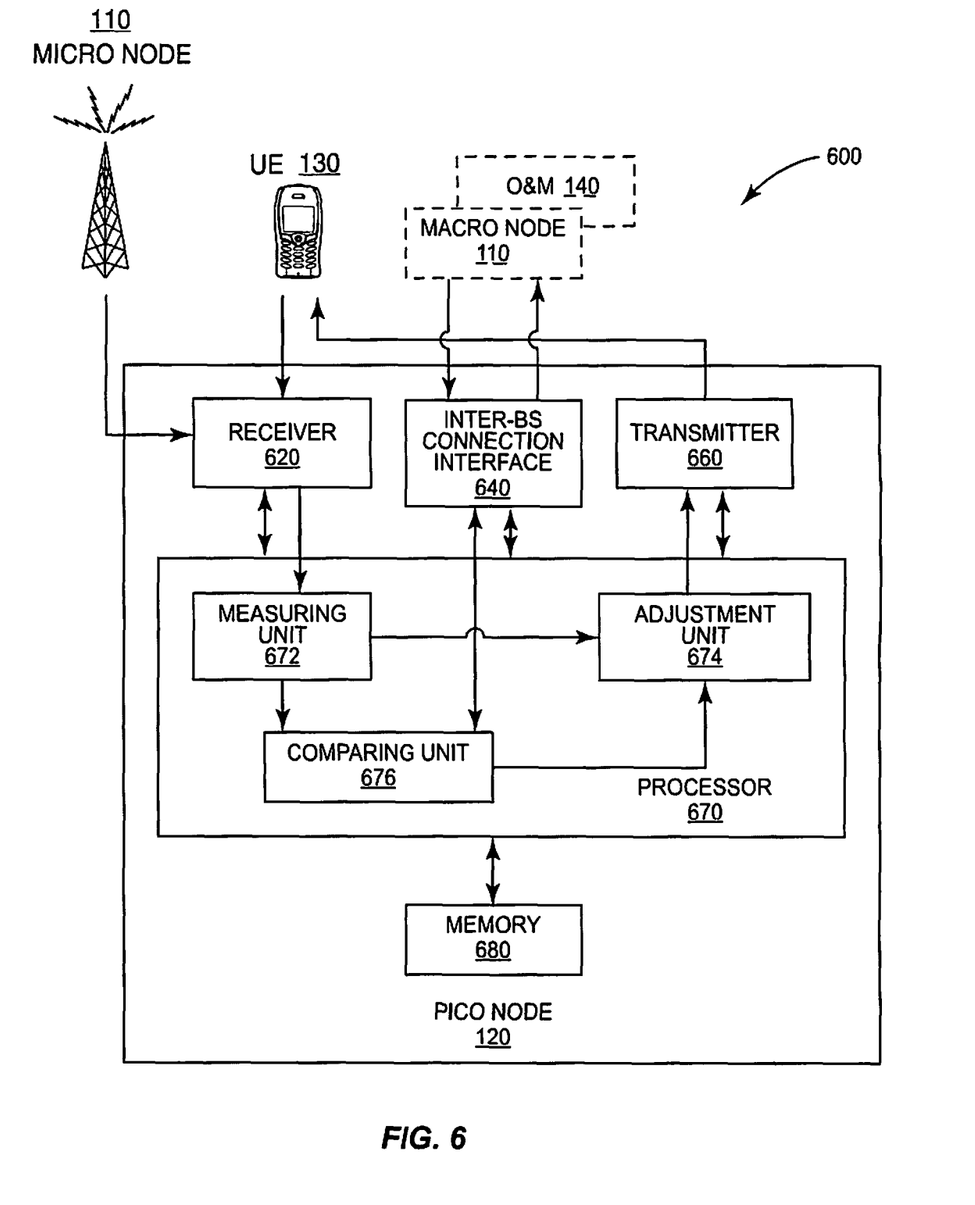
FIG. 6 is a block diagram illustrating features of an example pico-node in a heterogeneous cell deployment.

It will be readily apparent that several of the techniques described above are implemented in connection with a wireless base station, which may be deployed as a macro-node or a pico-node, for example. FIG. 6 is a block diagram of a wireless system 600 that includes an example pico-node 120, illustrating a few of the components relevant to the present techniques.

The system pictured in FIG. 6 includes, in addition to a pico-node 120 that is illustrated in some detail, a macro-node 110a UE 130, and an O&M node 190. The pico-node 120 is configured to communicate with macro-nodes 110 and O&M node 190 via inter-base-station interface 640, which comprises suitable network interface hardware controlled by software carrying out network interfacing protocols. Pico-node 120 includes a receiver 620 and transmitter 660 for communicating with UE 130; in some cases receiver 620 may also be configured to monitor and/or measure signals transmitted by macro-node 120. Receiver circuit 620 and transmitter circuit 660 use known radio processing and signal processing components and techniques, typically according to a particular telecommunications standard such as the 3GPP standard for LTE-Advanced. Because the various details and engineering tradeoffs associated with the design of interface circuitry and radio transceiver circuits are well known and are unnecessary to a full understanding of the invention, additional details are not shown.

It should be appreciated that a macro-node 110 may have a very similar configuration; thus the following description of the various components of pico-node 120 can also be applied, with suitable modifications, to the corresponding components in a macro-node 110 configured to carry out one or more of the techniques described above.

The pico-node 120 in FIG. 6 includes a receiver 620 that is configured at least to receive uplink signals from one or more mobile terminals 130, and a transmitter 660 that is configured to provide pico-beam coverage to the mobile terminals 130. (A macro-node 110 will have similar components, but configured to provide coverage for a macro-cell.) In some embodiments, the receiver 620 in pico-node 120 is configured to also receive signals from macro-node 110, which has coverage that overlaps that of pico-node 120. In the pictured system 600, only a single receiver 620 is shown; those skilled in the art will appreciate that this receiver 620 must be configured to simultaneously monitor mobile terminal uplink transmission frequencies and macro-node 110 downlink transmission frequencies. In other embodiments, two distinct receivers may be used.

The pico-node 120 of FIG. 6 further comprises an intra-base station connection interface 640, for communicating with macro-node 110 and/or other network nodes, as well as a processing circuit 670 that is configured to carry out one or more of the techniques described above. In particular, the processing circuit 670 in some embodiments is configured to receive, via the receiver circuit 620, a signal transmitted by a macro-node 110, to measure (using the illustrated measuring unit 672) the timing of the signal, the frequency of the signal, or both, and to adjust (using the adjustment unit 674) the timing, frequency, or both, of a signal transmitted by the pico-node, based on said measuring. In some embodiments, the processor 670 may base any adjustments on timing and/or frequency data obtained from the macro-node 110, via the intra-base station connection interface 640, instead of or in addition to the measurements made by the measuring unit 672. These techniques, which may include comparing (using the comparing unit 676) timing information received over the intra-base station connection interface 640 to measured timing, were described earlier.

The measuring unit 672, adjustment unit 674, and comparing unit 676 of FIG. 6 are illustrated as functional elements of a processor circuit 670. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of baseband processing circuitry for wireless base stations are well known and are unnecessary to a full understanding of the invention, additional details are not shown here Program code stored in the memory circuit may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method for synchronizing transmissions from a first transmitting node having a first coverage area and a second transmitting node having a second coverage area within the first coverage area, the method comprising:
   measuring, at the second transmitting node, a first timing or a first frequency, or both, of one or more signals received from the first transmitting node; and
   adjusting a second timing or a second frequency, or both, of a transmission from the second transmitting node to a mobile station, to align the transmission, as received at the mobile station, with the signals received at the mobile station from the first transmitting node.

2. The method of claim 1, wherein the one or more signals received from the first transmitting node comprise at least one of a primary synchronization signal, a secondary synchronization signal, a cell-specific reference signal, and a broadcast channel signal.

3. The method of claim 1, wherein the transmission from the second transmitting node comprises a physical downlink shared channel (PDSCH) in a Long-Term Evolution (LTE) network.

4. The method of claim 1, further comprising:
   measuring, at the second transmitting node, an uplink transmission from the mobile station;
   determining a timing offset, based on the measuring of the uplink transmission; and
   further adjusting the timing of the transmission from the second transmitting node to the mobile station, based on the timing offset.

5. The method of claim 4, wherein determining the timing offset is further based on a measurement of the uplink transmission by the first transmitting node.

6. A method for synchronizing transmissions from a first transmitting node having a first coverage area and a second transmitting node having a second coverage area within the first coverage area, the method comprising:
   measuring, at the second transmitting node, an uplink transmission from a mobile station;
   determining a timing offset, based on the measuring of the uplink transmission; and
   adjusting a transmission timing of a transmission from the second transmitting node to the mobile station, based on the timing offset, to align the transmission, with one or more signals received at the second transmitting node from the first transmitting node.

7. The method of claim 6, further comprising:
   measuring, at the second transmitting node, a received timing or a received frequency, or both, of the one or more signals received from the first transmitting node; and
   further adjusting the transmission timing or a transmission frequency, or both, of the transmission from the second transmitting node to the mobile station, to align the transmission with the signals received from the first transmitting node.

8. The method of claim 6, wherein the one or more signals received from the first transmitting node comprise at least one of a primary synchronization signal, a secondary synchronization signal, a cell-specific reference signal, and a broadcast channel signal.

9. The method of claim 6, wherein the transmission from the second transmitting node comprises a physical downlink shared channel (PDSCH) in a Long-Term Evolution (LTE) network.

10. A node for use in a wireless communication network, the node comprising:
   a transmitter circuit configured to transmit to a mobile station at any point in a first transmission coverage area;
   a receiver circuit configured to receive an uplink transmission from the mobile station and to receive one or more signals from a second wireless node, the second wireless node having a second transmission coverage area that includes the first transmission coverage area; and
   one or more processing circuits configured to:
      measure a first timing or a first frequency, or both, of the one or more signals received from the second wireless node; and
      adjust a second timing or a second frequency, or both, of a transmission from the node to the at least one mobile station, to align the transmission, as received from the mobile station, with the signals received at the mobile station from the second wireless node.

11. The node of claim 10, wherein the one or more signals received from the second wireless node comprise at least one of a primary synchronization signal, a secondary synchronization signal, a cell-specific reference signal, and a broadcast channel signal.

12. The node of claim 10, wherein the transmission from the wireless network node comprises a physical downlink shared channel (PDSCH) in a Long-Term Evolution (LTE) network.

13. The node of claim 10, wherein the one or more processing circuits are further configured to:
   measure the uplink transmission from the at least one mobile station;
   determine a timing offset, based on the measuring of the uplink transmission; and
   further adjust the timing of the transmission from the node to the mobile station, based on the timing offset.

14. The node of claim 13, wherein the one or more processing circuits are configured to determine the timing offset based further on a measurement of the uplink transmission by the second wireless node.

15. A node for use in a wireless communication network, comprising:
   a transmitter circuit configured to transmit to a mobile station at any point in a first transmission coverage area;
   a receiver circuit configured to receive an uplink transmission from the mobile station and to receive one or more signals from a second wireless node, the second wireless node having a second transmission coverage area that includes the first transmission coverage area; and
   one or more processing circuits configured to:
      measure the uplink transmission from the mobile station;
      determine a timing offset, based on the measuring of the uplink transmission; and
      adjust a transmission timing of a transmission from the node to the mobile station, based on the timing offset, to align the transmission with one or more signals received at the node from the second wireless node.

16. The node of claim 15, wherein the one or more processing circuits is further configured to:
   measure a received timing or a received frequency, or both, of the one or more signals received from the second wireless node; and
   further adjust the transmission timing or a transmission frequency, or both, of the transmission from the node to the mobile station, to align the transmission with the signals received from second wireless node.

17. The node of claim 15, wherein the one or more signals received from the second wireless node comprise at least one of a primary synchronization signal, a secondary synchronization signal, a cell-specific reference signal, and a broadcast channel signal.

18. The node of claim 15, wherein the transmission from the wireless network node to the mobile station comprises a physical downlink shared channel.

* * * * *

UNITED STATES PATENT AND TRADEMARK OFFICE
CERTIFICATE OF CORRECTION

PATENT NO.          : 8,954,104 B2                                            Page 1 of 1
APPLICATION NO.     : 13/389605
DATED               : February 10, 2015
INVENTOR(S)         : Parkvall et al.

It is certified that error appears in the above-identified patent and that said Letters Patent is hereby corrected as shown below:

In the Drawings:

In Fig. 6, Sheet 5 of 5, delete Tag "140" and insert Tag -- 190 --, therefor.

In the Specification:

In Column 2, Line 63, delete "pica-node," and insert -- pico-node, --, therefor.

In Column 5, Line 55, delete ""pica"" and insert -- "pico" --, therefor.

In Column 6, Line 60, delete "pica-node" and insert -- pico-node --, therefor.

In Column 7, Line 25, delete "pica-node," and insert -- pico-node, --, therefor.

In Column 7, Line 48, delete "pica-node" and insert -- pico-node --, therefor.

In Column 8, Line 62, delete "120." and insert -- 110. --, therefor.

Signed and Sealed this
Eighth Day of March, 2016

Michelle K. Lee
*Director of the United States Patent and Trademark Office*